US010044659B2

(12) United States Patent
Arshad et al.

(10) Patent No.: US 10,044,659 B2
(45) Date of Patent: *Aug. 7, 2018

(54) DYNAMIC E-MAIL CHAIN PARTICIPANT MANAGER

(71) Applicant: International Business Machines Corporation, Armonk, NY (US)

(72) Inventors: Muneeb Arshad, Poughkeepsie, NY (US); Ali Y. Duale, Poughkeepsie, NY (US); Shailesh R. Gami, Poughkeepsie, NY (US); Louis P. Gomes, Poughkeepsie, NY (US); Vijai Kalathur, Wappingers Falls, NY (US); Rajaram B. Krishnamurthy, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,702

(22) Filed: Dec. 28, 2017

(65) Prior Publication Data

US 2018/0115505 A1 Apr. 26, 2018

Related U.S. Application Data

(63) Continuation of application No. 15/262,028, filed on Sep. 12, 2016.

(51) Int. Cl.
*G06F 15/16* (2006.01)
*H04L 12/58* (2006.01)
*H04L 29/06* (2006.01)

(52) U.S. Cl.
CPC .......... *H04L 51/16* (2013.01); *H04L 51/12* (2013.01); *H04L 51/24* (2013.01); *H04L 51/28* (2013.01); *H04L 63/10* (2013.01)

(58) Field of Classification Search
USPC .................................. 709/206, 204; 424/59
See application file for complete search history.

(56) References Cited

U.S. PATENT DOCUMENTS 8,874,678 B2 10/2014 Tu
2004/0254989 A1 12/2004 Baratakke et al.
(Continued)

OTHER PUBLICATIONS

List of IBM Patents or Patent Applications Treated as Related. Filed Herewith. 2 pages.
U.S. Appl. No. 15/262,028, filed Sep. 12, 2016.

*Primary Examiner* — Tammy Nguyen
(74) *Attorney, Agent, or Firm* — Alexander G. Jochym

(57) ABSTRACT

An approach for new recipient inclusion to e-mail chains. E-mail chain manager receives include participants associated with an e-mail chain, current participants in the current e-mail chain distribution and authorization rules associated with the e-mail chain. The e-mail chain manager determines inclusion authorizations for the include participants based on comparing the include participants with the authorization rules and creates authorization results associated with the include participants. In response to determining the authorization results are passed, the e-mail chain manager creates authorized include participants. The e-mail chain manager creates the participant notifications where the participant notifications are based on the authorized include participants and outputs the participant notifications based on predetermined participant preferences of the current participants. The e-mail chain manager outputs the e-mail chain to the authorized include participants and creates a next e-mail chain distribution based on combining the authorized include participants and the current participants.

1 Claim, 5 Drawing Sheets

(56) References Cited

U.S. PATENT DOCUMENTS

| | | | |
|---|---|---|---|
| 2007/0073871 A1* | 3/2007 | Adams | G06Q 10/107 |
| | | | 709/224 |
| 2008/0098072 A1 | 4/2008 | Jones et al. | |
| 2009/0098072 A1* | 4/2009 | Rudolph | A23L 3/3499 |
| | | | 424/59 |
| 2010/0017328 A1 | 1/2010 | Stephen et al. | |
| 2010/0293475 A1 | 11/2010 | Nottingham et al. | |
| 2011/0283335 A1 | 11/2011 | Bussard et al. | |
| 2012/0173490 A1 | 7/2012 | Gould et al. | |
| 2016/0269336 A1* | 9/2016 | Blinder | H04L 51/22 |
| 2017/0085510 A1* | 3/2017 | Jawaharlal | H04L 51/16 |

* cited by examiner

DYNAMIC E-MAIL CHAIN PARTICIPANT MANAGER

BACKGROUND OF THE INVENTION

The present invention relates generally to electronic mail (e-mail), and more specifically to providing a complete e-mail chain toward new participants while reducing existing participant e-mail exchanges.

A history of e-mail communication between participants is known as an e-mail chain/thread. An originator of an e-mail chain starts a conversation with initial participants and additional participants can be included as the conversation progresses. A history of each response to the conversation can be "chained" together, creating a record for a reader to see the progression of a conversation topic as e-mail is exchanged among participants. As participants are added, it can be valuable to share the e-mail chain so that an include participant can understand the conversation history. Simply forwarding the e-mail chain to an include participant without other participants in the chain can break the conversation thread and forwarding the e-mail chain to an include participant and all current participants can create "noise" in the e-mail chain and can interrupt/distract participants as they receive e-mail updates comprising administrative information about participant adds within the e-mail chain. Further the e-mail chain history of exchanges can compound miscellaneous "clutter" in the conversation as participants can add verbose notes indicating who and why a participant was included.

SUMMARY

As disclosed herein, a method for new recipient inclusion to e-mail chains, the method comprising: receiving, by one or more computer processors, one or more include participants associated with an e-mail chain for addition to a current e-mail chain distribution, wherein the current e-mail chain distribution comprises an addressee field and a courtesy copy field; receiving, by one or more computer processors, one or more current participants in the current e-mail chain distribution for one or more participant notifications of the one or more include participants to the one or more current participants; receiving, by one or more computer processors, one or more authorization rules associated with the e-mail chain for authorizing the one or more include participants, wherein the one or more authorization rules are based on at least one of an e-mail server setting, an e-mail chain originator setting or an e-mail chain approver setting; determining, by one or more computer processors, inclusion authorizations for the one or more include participants based on comparing the one or more include participants with the one or more authorization rules and creating authorization results associated with the one or more include participants; responsive to determining the authorization results are passed, creating, by one or more computer processors, one or more authorized include participants; creating, by one or more computer processors, the one or more participant notifications wherein the one or more participant notifications are based on the one or more authorized include participants; outputting, by one or more computer processors, the one or more participant notifications based on predetermined participant preferences of the one or more current participants, wherein the one or more participant notifications output comprises at least one of a pop-up message, a notification e-mail or a text message; outputting, by one or more computer processors, the e-mail chain to the one or more authorized include participants; creating, by one or more computer processors, a next e-mail chain distribution based on combining the one or more authorized include participants and the one or more current participants; responsive to determining the authorization results are failed, creating, by one or more computer processors, an associated permission request; sending, by one or more computer processors, the associated permission request to an e-mail chain approver; receiving, by one or more computer processors, a permission response associated with the permission request from the e-mail chain approver; responsive to the permission response being a deny response, filtering by one or more computer processors, the one or more include participants associated to the deny response from the one or more authorized include participants; and responsive to the permission response being an approve response, adding by one or more computer processors, the one or more include participants associated to the approve response to the one or more authorized include participants.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Aspects of the present disclosure and certain features, advantages and details thereof, are explained more fully below with reference to the non-limiting examples illustrated in the accompanying figures. Descriptions of well-known materials, fabrication tools, processing techniques, etc., are omitted to avoid obscuring the disclosure with unnecessary detail. It should be understood, however, that the detailed description and the specific examples, while indicating aspects of the invention, are given by way of illustration only and not by way of limitation. Various substitutions, modifications, additions and/or arrangements, within the spirit and/or scope of the underlying inventive concepts will be apparent to those skilled in the art from this disclosure.

Embodiments of the present invention provide systems, methods, and computer program products to enable a 'silent' inclusion of participants to an e-mail chain/thread while minimizing extraneous e-mail exchanges with current participants of an e-mail conversation. An "include participant" feature can enhance e-mail protocols to enable an e-mail system to provide for an include participant(s) being introduced into an existing e-mail thread (e.g., not in an original send list) without distributing the current e-mail chain toward current participants. Embodiments of the present invention can send a full e-mail chain to the new include participant(s), revise participant addressees (e.g., send to and/or courtesy copy) in server copies of the e-mail chain and provide optional notification of include participant(s) toward current participants. With the updated server copies of the e-mail chain distribution comprising current and added include participant(s), new e-mail responses by any participant can comprise full participant inclusion. Further, in some embodiments of the present invention an authorization feature can be employed to limit include participants based on passing authorization rules. Authorization rules can be established by predetermined e-mail system settings and/or an e-mail chain originator/approver.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

Figure 1:
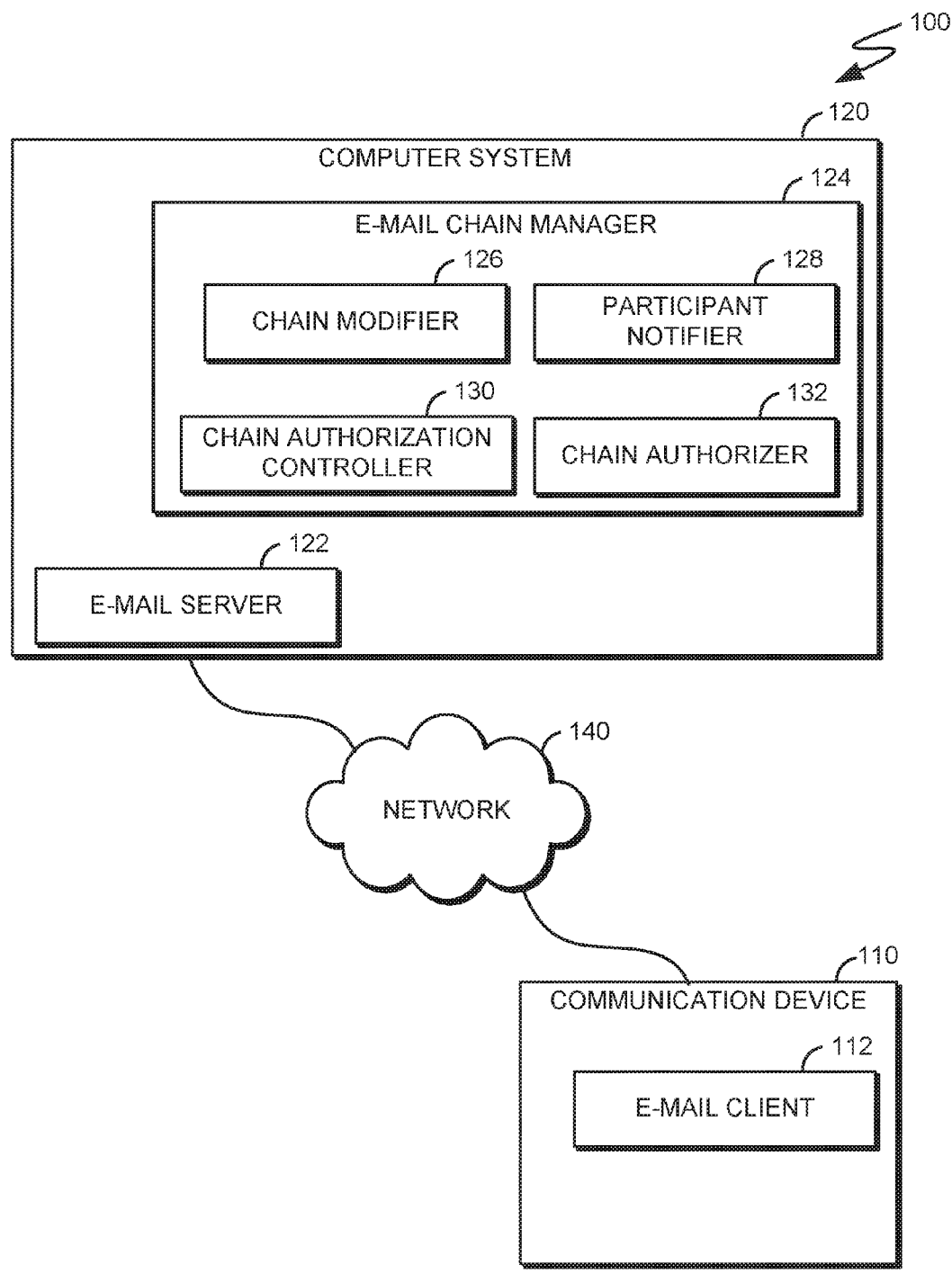
FIG. 1 illustrates a functional block diagram of a computing environment, in accordance with an embodiment of the present invention.

FIG. 1 illustrates a functional block diagram of computing environment 100, in accordance with an embodiment of the present invention. Computing environment 100 comprises COMMUNICATION DEVICE 110, and COMPUTER SYSTEM 120, interconnected via NETWORK 140. COMMUNICATION DEVICE 110 and COMPUTER SYSTEM 120 can be desktop computers, laptop computers, specialized computer servers, or the like. In certain embodiments, COMMUNICATION DEVICE 110 and COMPUTER SYSTEM 120 represent computer systems utilizing clustered computers and components acting as a single pool of seamless resources via NETWORK 140. For example, such embodiments can be used in data center, cloud computing, storage area network (SAN), and network attached storage (NAS) applications. In general, COMMUNICATION DEVICE 110 and COMPUTER SYSTEM 120 are representative of any electronic devices, or combination of electronic devices, capable of executing computer readable program instructions, as described in detail with regard to FIG. 5.

In one embodiment of the present invention, COMMUNICATION DEVICE 110 comprises E-MAIL CLIENT 112. E-MAIL CLIENT 112 can be a plurality of E-MAIL CLIENTS 112 within COMMUNICATION DEVICE 110. E-MAIL CLIENT 112 can be an application used to perform operations such as, but not limited to, receiving, sending and managing e-mail locally within COMMUNICATION DEVICE 110 and/or within E-MAIL SERVER 122. E-MAIL CLIENT 112 can operate with E-MAIL SERVER 122 and can comprise any combination of commercial or custom devices and/or software products associated with operating and maintaining an e-mail system.

In one embodiment of the present invention, NETWORK 140 can be, for example, a local area network (LAN), a wide area network (WAN) such as, the Internet, or a combination of the two, and include wired, wireless, or fiber optic connections. In general, NETWORK 140 can be any combination of connections and protocols that will support communications between COMMUNICATION DEVICE 110 and COMPUTER SYSTEM 120, in accordance with an embodiment of the present invention.

In one embodiment of the present invention, COMPUTER SYSTEM 120 comprises, E-MAIL SERVER 122 and E-MAIL CHAIN MANAGER.124.

In one embodiment of the present invention, E-MAIL SERVER 122 can be a plurality of E-MAIL SERVERS 122 within COMPUTER SYSTEM 120. E-MAIL SERVER 122 can manage e-mail processing such as, but not limited to, sending and/or receiving messages using an e-mail protocol such as, but not limited to, POP3, IMAP and SMTP over NETWORK 140. E-MAIL SERVER 122 can store e-mail messages in locations such as, but not limited to, user mailboxes, inboxes. E-MAIL SERVER 122 can operate with E-MAIL CLIENT 112 and can comprise any combination of commercial or custom devices and/or software products associated with operating and maintaining an e-mail system. It should be noted that during operation of E-MAIL CLIENT 112, e-mail can be stored locally on a user's COMMUNICATION DEVICE 110 where local copies of e-mail can be replicated between E-MAIL CLIENT 112 and E-MAIL SERVER 122 and in other implementations, e-mail can be stored on E-MAIL SERVER 122 where E-MAIL CLIENT 112 can be a user interface with E-MAIL SERVER 122 e-mail. Embodiments of the present invention can operate in combinations of E-MAIL CLIENT 112 and/or E-MAIL SERVER 122 implementations.

In one embodiment of the present invention, E-MAIL CHAIN MANAGER 124 can be a plurality of E-MAIL CHAIN MANAGERS 124 within COMPUTER SYSTEM 120 and/or within E-MAIL SERVER 122. Further, components of E-MAIL CHAIN MANAGER 124 can be a separate and/or integrated with E-MAIL SERVER 122 and/or E-MAIL CLIENT 112. E-MAIL CHAIN MANAGER 124 comprises, CHAIN MODIFIER 126, PARTICIPANT NOTIFIER 128, CHAIN AUTHORIZATION CONTROLLER 130 and CHAIN AUTHORIZER 132. In embodiments of the present invention, E-MAIL CHAIN MANAGER 124 can operate in conjunction with a combination of commercial or custom devices and/or software products associated with 'silent' inclusion of participants of e-mail chains/threads.

In one embodiment of the present invention, CHAIN MODIFIER 126 can be a plurality of CHAIN MODIFIERS 126 within E-MAIL CHAIN MANAGER 124. CHAIN MODIFIER 126 can receive a list of include participants to be added to an e-mail chain. CHAIN MODIFIER 126 can determine if an e-mail chain authorization control has been established for an e-mail chain and if not established, CHAIN MODIFIER 126 can call CHAIN AUTHORIZATION CONTROLLER 130 to establish authorization rules for an affected e-mail chain. CHAIN MODIFIER 126 can process an approved include participant request, send an affected e-mail chain toward the include participant(s) and can add one or more e-mail participants on e-mail chain distribution in addressee (e.g., 'To' field) and/or courtesy copy (e.g., '.cc' field) fields to assure further e-mail responses comprise current and include participants. It should be noted that if copies of an e-mail chain are stored on multiple E-MAIL SERVER 122, updates can be replicated to synchronize e-mail chain distribution content.

In one embodiment of the present invention, PARTICIPANT NOTIFIER 128 can be a plurality of PARTICIPANT NOTIFIERS 128 within E-MAIL CHAIN MANAGER 124. PARTICIPANT NOTIFIER 128 can create participant notification(s) when include participant(s) are added to an e-mail chain. PARTICIPANT NOTIFIER 128 can create participant notifications associated with an affected e-mail chain on E-MAIL SERVER 122. PARTICIPANT NOTIFIERS 128 can receive participant notification settings and/or e-mail chain specific local notify settings to determine if participant notifications should be output toward one or more of current participants. Output of a participant notification can be suppressed or delivered using methods such as, but not limited to, pop-up message, mobile device text message and e-mail. It should be noted that separate and/or combination of user selections, predetermined settings and system configuration settings can affect how and when participant notifications are output. PARTICIPANT NOTIFIER 128 can time output of participant notifications to occur when events such as, but not limited to, as include participants are added, when an include participant interacts with a received e-mail chain and when a current participant interacts with an affected e-mail chain The two latter participant notification examples in the previous example can be termed delayed participant notifications whereas the former, can be termed an immediate participant notification. It should be further noted that participant notification can comprise information such as, but not limited to, include participant name/e-mail address, time stamp of inclusion and an identifier/hot-link to the associated e-mail chain.

In one embodiment of the present invention, CHAIN AUTHORIZATION CONTROLLER 130 can be a plurality of CHAIN AUTHORIZATION CONTROLLERS 130 within E-MAIL CHAIN MANAGER 124. CHAIN AUTHORIZATION CONTROLLER 130 can receive authorization settings based on include participant authorization settings comprising separate and/or combination of e-mail originator authorization selections, predetermined settings and system configuration settings. CHAIN AUTHORIZATION CONTROLLER 130 can process authorization settings to limit/filter participants that can be included in an e-mail chain. For example, an e-mail domain list (e.g., company.com) can be established to limit e-mail exchanges between participants within an internal Company e-mail system and/or a Country. Further, an e-mail chain originator may want to control participant inclusion within an authorized group (e.g., limit distribution to members of a Development project). In some embodiments of the present invention CHAIN AUTHORIZATION CONTROLLER 130 can store authorization rules in locations such as, but not limited to, e-mail chain metadata, E-MAIL CHAIN MANAGER 124 (e.g., data store) and E-MAIL SERVER 122.

In one embodiment of the present invention, CHAIN AUTHORIZER 132 can be a plurality of CHAIN AUTHORIZERS 132 within E-MAIL CHAIN MANAGER 124. CHAIN AUTHORIZER 132 can compare include participant information with authorization rules to determine if an include participant can be added to an e-mail chain (e.g., filter unauthorized include participants). Authorization rules can comprise information such as, but not limited to, a Company e-mail domain, Country e-mail domain, user list and user group. For example, an include participant can have a domain that matches authorized domains established in E-MAIL SERVER 122 and the include participant can then be included in the e-mail chain conversation. In another example, a participant adds an include participant and the include participant name does not match members of an authorization group established by the e-mail chain originator. In this example, the participant attempting an addition of an include participant can be prompted by CHAIN AUTHORIZER 132 of an authorization check result is 'failed'. In the case of an failed authorization, the requesting participant can send an authorization request through CHAIN AUTHORIZER 132 as a workflow message toward the originator/approver to accept/deny the include participant. The requesting participant can be notified via a permission response to indicate an accept/deny and the inclusion process can proceed/cancel based on the respective originator/approver decision.

Figure 2:
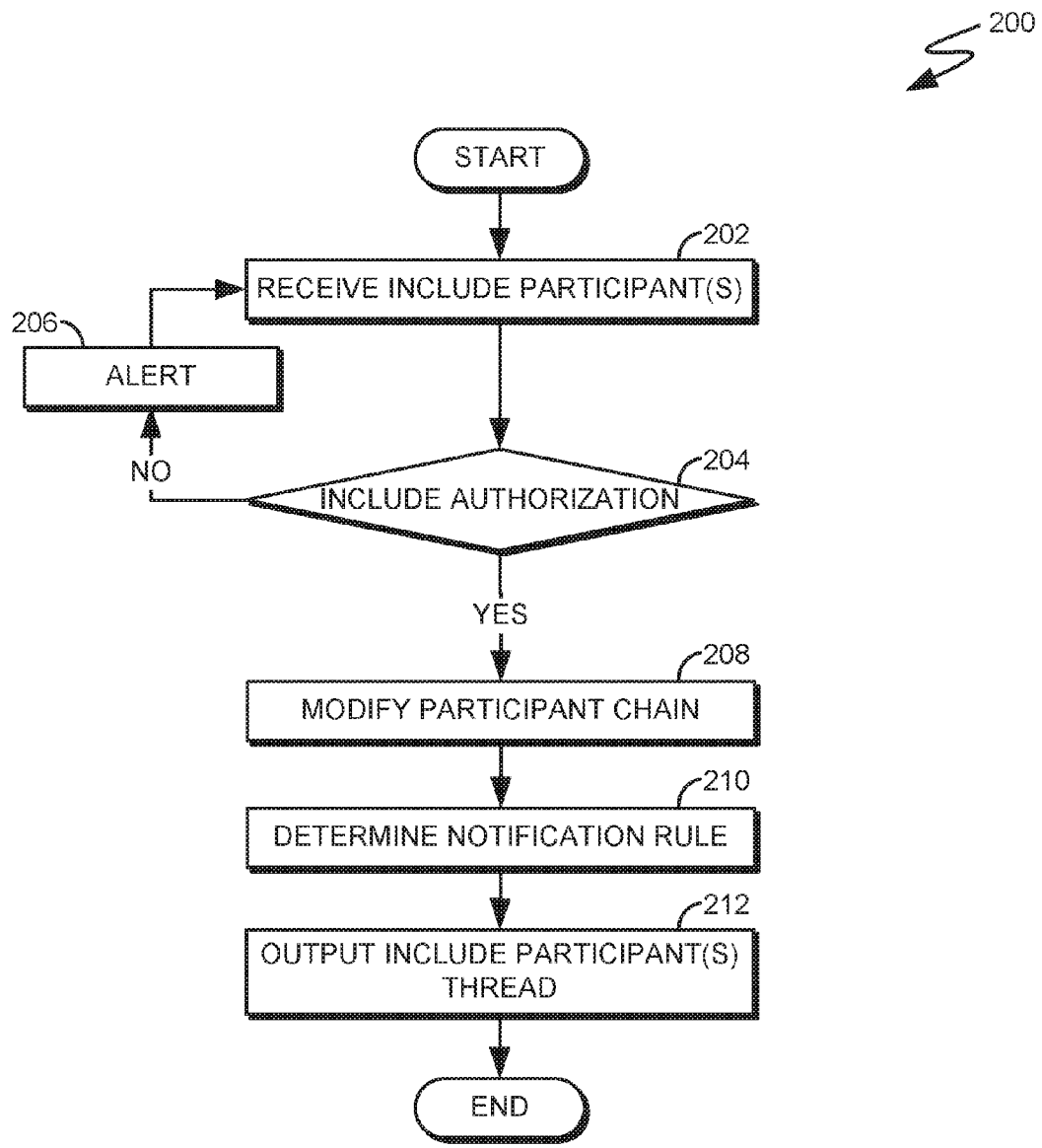
FIG. 2 illustrates a flowchart of adding an e-mail chain participant, in accordance with an embodiment of the present invention.

FIG. 2 illustrates a flowchart of adding an e-mail chain participant, in accordance with an embodiment of the present invention. The e-mail chain participant flowchart 200, comprises operations RECEIVE INCLUDE PARTICIPANT(S) 202, INCLUDE AUTHORIZATION 204, ALERT 206, MODIFY PARTICIPANT CHAIN 208, DETERMINE NOTIFICATION RULE 210 and OUTPUT INCLUDE PARTICIPANT(S) THREAD 212.

Operation RECEIVE INCLUDE PARTICIPANT(S) 202, can receive one or more include participants to be added in an e-mail chain addressee list (e.g., 'to') and/or courtesy copy list (e.g., '.cc'). In embodiments of the present invention, an e-mail chain current participant can initiate a process to include participants to an e-mail chain. Operation RECEIVE INCLUDE PARTICIPANT(S) 202 can create an include participant request on the request participant's E-MAIL SERVER 122. When operation RECEIVE INCLUDE PARTICIPANT(S) 202 completes, processing proceeds toward operation INCLUDE AUTHORIZATION 204.

Operation INCLUDE AUTHORIZATION 204, can determine if include participant(s) can be allowed to be added (e.g., CHAIN AUTHORIZER 132). If operation INCLUDE AUTHORIZATION 204 determines one or more include participants cannot be added (e.g., NO), based on failed authorization check (e.g., authorization result), then processing proceeds toward operation ALERT 206. Otherwise, an authorization result is indicated as passed (e.g., YES) and operation INCLUDE AUTHORIZATION 204 processing proceeds toward operation MODIFY PARTICIPANT CHAIN 208.

Operation ALERT 206, can send alert notification toward the participant performing an include participant operation. Operation ALERT 206 can output an error message that identifies one or more conditions that cause failed operation AUTHORIZATION 204. Operation INCLUDE AUTHORIZATION 204 can offer resolution recommendation such as, but not limited to, contacting the e-mail originator/approver to permit an include participant, requesting the e-mail originator/approver to expand authorization rules for the e-mail chain, cancel the include participant operation and initiating an automated electronic forms process to satisfy the authorization rule criteria. In an example of automated forms processing, a permission request can be sent for each failed authorization toward the e-mail originator/approver where the e-mail originator/approver can respond with a permission response to approve/deny each associated permission request. When operation ALERT 206 completes, processing proceeds toward operation RECEIVE INCLUDE PARTICIPANT(S) 202 for current participant action and/or reprocessing.

In operation MODIFY PARTICIPANT CHAIN 208, one or more e-mail chain copies that can be stored on one or more e-mail servers (e.g., E-MAIL SERVER 122) of the affected e-mail chain are updated by CHAIN MODIFIER 126 with the expanded e-mail chain distribution (e.g., original participants and include participants). Each e-mail participant mail identifier can be searched by CHAIN MODIFIER 126 to determine other e-mail servers (e.g., alternate e-mail domains) storing the e-mail chain to synchronize e-mail chain participants and related metadata. E-mail server synchronization can be achieved using replication of an include user request toward other e-mail domains and/or by other methods based on include user requests. It should be noted that a separate include list and associated participant notification history can be stored in an affected e-mail chain to provide an ability to store a history and/or determine an inclusion point of participant(s) in an e-mail chain (e.g., when participants were included) and to enable a method to identify that current participants have been notified of an include participant event. It should be further noted that mechanisms such as, but not limited to, timestamps can be provided in e-mail metadata to support audit related tracking processes and/or text strings can be made visible during each include participant event. Also, it should be noted that inclusion of a visible text string would not initiate a broadcast of the e-mail chain toward current participants but rather would be visible when a participant first interacts with an e-mail chain after an include participant is added. In an example of Simple Mail Transfer Protocol (SMTP) implementation, the SMTP can operate mail functions such as, but not limited to, session initiation, sending, verifying names, opening/closing exchanges. Embodiments of the present invention can comprise SMTP commands such as, but not limited to, MAIL (e.g., sender/from information), RCPT (e.g., recipient/addressee information) and DATA (e.g., initiates transfer/exchange of mail). In the example, the RCPT command can process include participant(s) and the DATA command can limit sending of an e-mail toward the include participant(s) while current participants' associated mail servers can receive participant notifications to indicate the include participant(s). Further, the originator of an include request can be processed by the MAIL command, in combination with the DATA command, to operate with authorization rules and control e-mail exchange. When operation MODIFY PARTICIPANT CHAIN 208 completes, processing proceeds toward operation DETERMINE NOTIFICATION RULE 210.

Operation DETERMINE NOTIFICATION RULE 210, can create participant notifications associated with an affected e-mail chain and determine if the participant notifications of included participant(s) are to be sent to other participants by PARTICIPANT NOTIFIER 128. Operation DETERMINE NOTIFICATION RULE 210 can receive predetermined participant notification settings and/or an originator local notification method to identify which current participants receive participant notification, when an include participant event occurs and what type of participant notification should be sent (e.g., pop-up, e-mail, text message, etc.). PARTICIPANT NOTIFIER 128 can also delay participant notification until a current participant opens and/or interacts with an e-mail chain. In this operating mode, include fields in an e-mail chain can be compared to participant notification history fields to determine if include participants have been recorded since the participant's last interaction and if participant notification has been completed. For example, three participants have been included since the last time 'participant A' opened an e-mail chain. PARTICIPANT NOTIFIER 128 can detect the three participants added and upon 'participant A' opening the e-mail chain, 'participant A' can receive a pop-up message identifying the included participants. In some embodiments of the present invention an e-mail chain metadata can store a participant notification override related to an e-mail chain. For example, an originator default participant notification may be 'do not notify' but for specific high importance e-mail chain, the originator can specify that text messages be sent when an include participant is requested and/or an authorization request needs processing. In this example, an owner can set a local notification setting to achieve the desired operation. When operation DETERMINE NOTIFICATION RULE 210 completes, processing proceeds toward operation OUTPUT INCLUDE PARTICIPANT(S) THREAD 212.

Operation OUTPUT INCLUDE PARTICIPANT(S) THREAD 212, can operate on an affected e-mail chain by selectively sending the current e-mail chain toward the include participant(s) while preventing re-distribution of the e-mail chain to current participants. It should be noted that CHAIN MODIFIER 126 can operate with E-MAIL SERVER 122 to identify the include participants that can be sent a current e-mail chain by using a combination of fields such as, but not limited to, include, to and cc, to identify participants that can be sent the current e-mail vs. which current participants already have been sent the current e-mail chain (e.g., prior to the include participant event). When operation OUTPUT INCLUDE PARTICIPANT(S) THREAD 212 completes, processing ends.

Figure 3A:
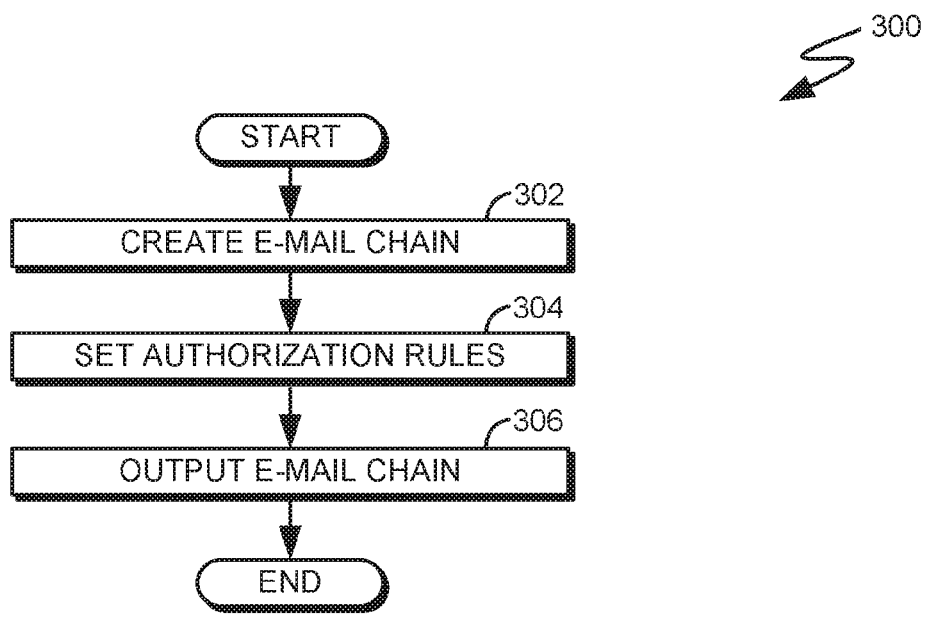
FIG. 3A illustrates a flowchart of an e-mail authorization rule setup, in accordance with an embodiment of the present invention.

FIG. 3A illustrates a flowchart of an e-mail authorization rule setup, in accordance with an embodiment of the present invention. The e-mail authorization rule setup flowchart 300 represents the creation of an e-mail chain comprising initialization of include participant authorization rules and comprises operations CREATE E-MAIL CHAIN 302, SET AUTHORIZATION RULES 304 and OUTPUT E-MAIL CHAIN 306.

In operation CREATE E-MAIL CHAIN 302, an e-mail chain originator can draft an e-mail and if authorization control is desired, the originator can select/define rules to limit participants that can be added to the e-mail chain. CHAIN AUTHORIZATION CONTROLLER 130 can output predetermined authorization options for an e-mail originator to select and/or the e-mail originator can establish authorization rules. Authorization rules can comprise attributes such as, but not limited to, security group, e-mail domain and personnel organization reporting. When operation CREATE E-MAIL CHAIN 302 completes, processing proceeds toward operation SET AUTHORIZATION RULES 304.

With authorization rules defined by an e-mail originator and/or predetermined E-MAIL SERVER 122 settings, operation SET AUTHORIZATION RULES 304, can store authorization rules in the e-mail chain to enable authorization control as include participants are processed. When operation SET AUTHORIZATION RULES 304 completes, processing proceeds toward operation OUTPUT E-MAIL CHAIN 306.

Operation OUTPUT E-MAIL CHAIN 306 sends the e-mail chain based on E-MAIL SERVER 122 and/or E-MAIL CLIENT 112 delivery methods. When Operation OUTPUT E-MAIL CHAIN 306 completes, processing ends.

Figure 3B:
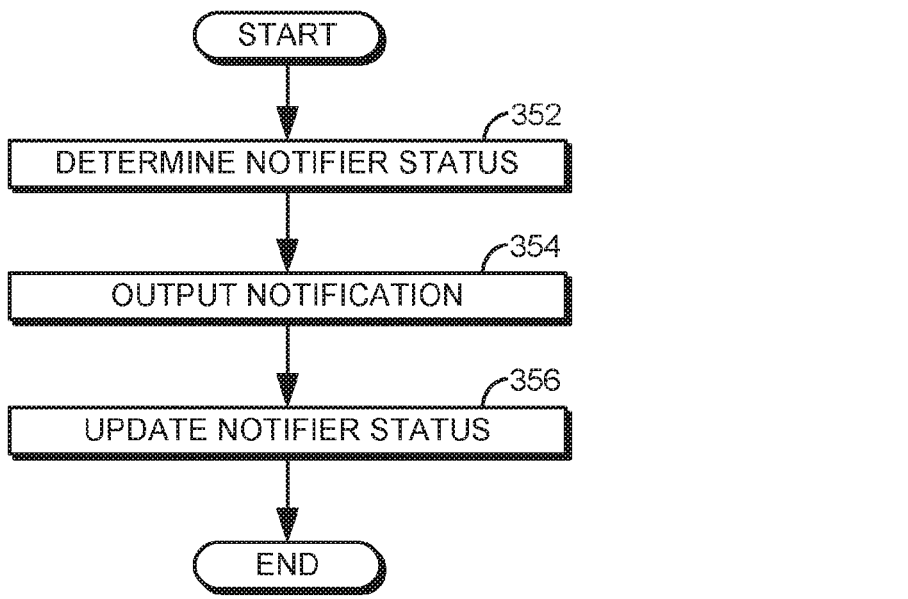
FIG. 3B illustrates a flowchart of an e-mail participant notifier, in accordance with an embodiment of the present invention.

FIG. 3B illustrates a flowchart of an e-mail participant notifier, in accordance with an embodiment of the present invention. The participant notifier flowchart 350 represents output of include participant notification based on participant notification status and comprises operations DETERMINE NOTIFIER STATUS 352, OUTPUT NOTIFICATION 354 and UPDATE NOTIFIER STATUS 356.

Operation DETERMINE NOTIFIER STATUS 352, can determine if participant has been notified of any participant inclusions. PARTICIPANT NOTIFIER 128 can receive e-mail chain participant notification settings and if a participant notification is to be output. If participant notification is expected by a current participant, PARTICIPANT NOTIFIER 128 can determine if include participant(s) have been added where a participant notification has not been output. Participant notification output determination can be based administrative e-mail data (e.g., metadata) such as, but not limited to, notify history, to (e.g., addressee), cc (e.g., courtesy copy) and include fields. When operation DETERMINE NOTIFIER STATUS 352 completes, processing proceeds toward operation OUTPUT NOTIFICATION 354.

Operation OUTPUT NOTIFICATION 354, can create participant notifications and sent toward E-MAIL SERVER 122 as include participants are processed and can output participant notifications toward current participants via methods such as, but not limited to, pop-up messages, mobile device text messages and e-mail. PARTICIPANT NOTIFIER 128 can receive predetermined notification settings based on participant, local notification settings and/or E-MAIL SERVER 122 settings. When operation OUTPUT NOTIFICATION 354 completes, processing proceeds toward operation UPDATE NOTIFIER STATUS 356.

Operation UPDATE NOTIFIER STATUS 356, can store participant notification status history to record when each current participant has been notified based on an include participant event. A history of participant notifications can be stored in administrative e-mail chain data/metadata such as, but not limited to, notify history fields. When operation UPDATE NOTIFIER STATUS 356 completes, processing ends until a next participant e-mail chain interaction and/or a next include participant event.

Figure 4:
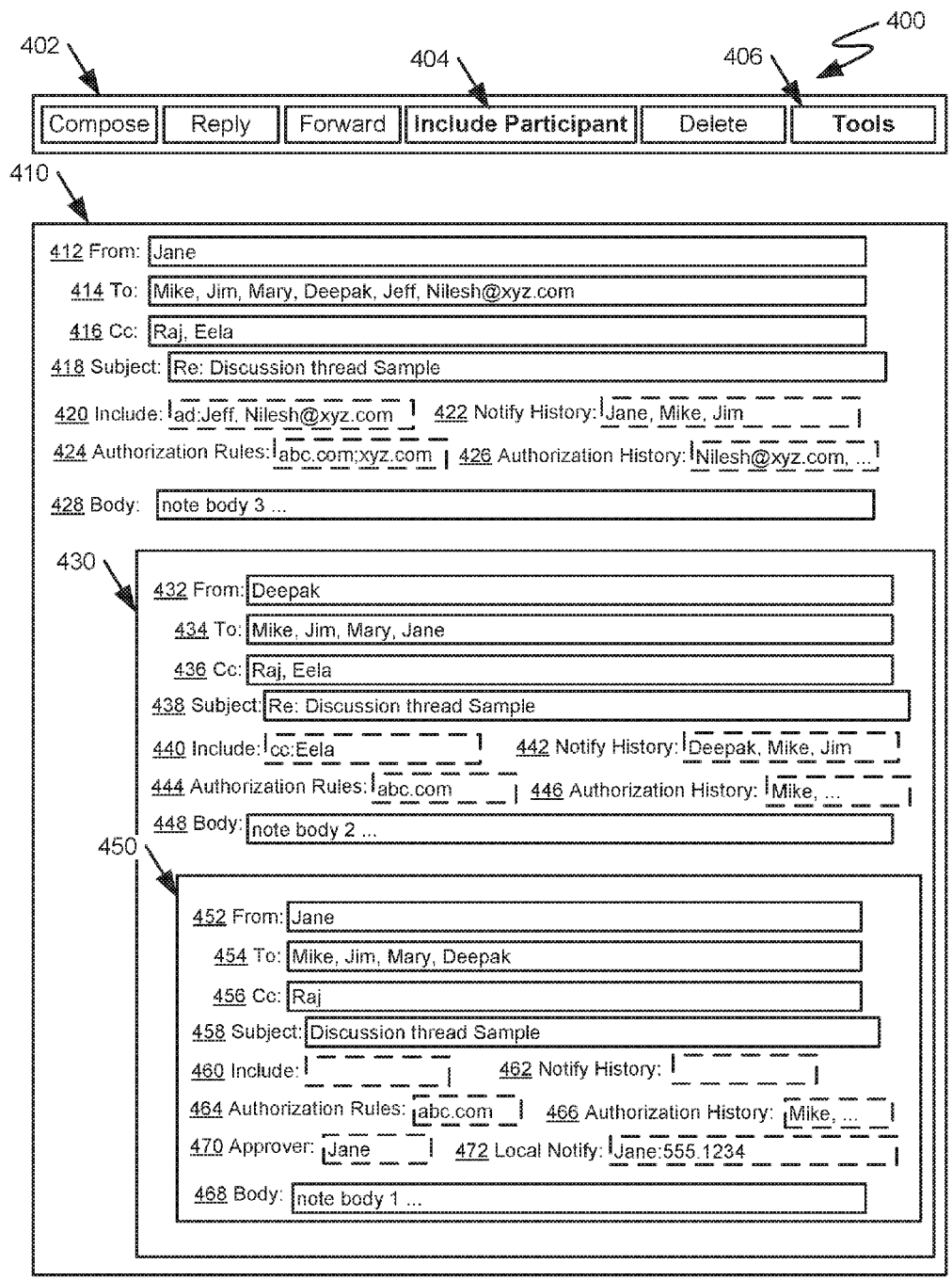
FIG. 4 illustrates a sample e-mail chain, in accordance with an embodiment of the present invention.

FIG. 4 illustrates a sample e-mail chain, in accordance with an embodiment of the present invention. The sample e-mail chain 400 represents a nested e-mail chain. Item e-mail header 402 and item Second response include participant (e-mail_3) 410 represents a current view of an e-mail chain. Item Second response include participant (e-mail_3) 410 comprises a history of e-mail exchanges between participants and comprises item First response include participant (e-mail_2) 430 whereas item First response include participant (e-mail_2) 430 further comprises item Originating e-mail chain (e-mail_1) 450.

Item e-mail header 402 comprises Item Include Participant 404 and Item Tools 406. Item Include Participant 404 can be used to initiate inclusion of an include participant (e.g., include participant) in the current e-mail chain. Item Tools 406 can comprise features such as, but not limited to, local user/participant notification settings (e.g., modify user notification methods), view history of inclusions (e.g., list e-mail chain inclusion histories) and set local notification method (e.g., override default notification for current e-mail chain).

Item Originating e-mail chain (e-mail_1) 450 comprises items From_1 452, addressee_To_1 454, addressee_Cc_1 456, Subject_1 458, Include_1 460, Notify History_1 462, Authorization Rules_1 464, Authorization History_1 466, Body_1 468, Approver 470 and Local Notify 472.

Item First response include participant (e-mail_2) 430 comprises From_2 432, addressee_To_2 434, addressee_Cc_2 436, Subject_2 438, Include_2 440, Notify History_2 442, Authorization Rules_2 444, Authorization History_2 446 and Body_2 448.

Item Second response include participant (e-mail_3) 410 comprises items From_3 412, addressee_To_3 414, addressee_Cc_3 416, Subject_3 418, Include_3 420, Notify History_3 422, Authorization Rules_3 424, Authorization History_3 426 and Body_3 428.

Items Subject_1 458, Subject_2 438 and Subject_3 418 are text fields identify the subject of an e-mail chain whereas items Body_1 468, Body_2 448 and Body_3 428 comprise the content of each e-mail exchange between participants.

Items From_1 452, From_2 432 and From_3 412 identify a participant that initiates a response for each e-mail chain exchange. It should be noted that item From_1 452 can also be known as the originator of the e-mail chain.

Items addressee_To_1 454, addressee_To_2 434 and addressee_To_3 414 comprise primary participants in an e-mail chain distribution whereas items addressee_Cc_1 456, addressee_Cc_2 436 and addressee_Cc_3 416 comprise participants of an e-mail chain distribution that can be considered secondary and/or need content knowledge of the e-mail chain.

Item Originating e-mail chain (e-mail_1) 450 comprises e-mail chain originator, 'Jane' (item From_1 452), current participants, Mike, Jim, Mary, Deepak (item addressee_To_1 454) and current participant, Raj (item addressee_Cc_1 456). Items Include_1 460 and Notify History_1 462 are hidden metadata fields (e.g. indicated in dashed box) and are uninitialized in the originating e-mail. Further, item Authorization History_1 466 indicates the contents of item addressee_To_1 454 and/or item addressee_Cc_1 456 as a technique to track include participants passing authorization rules based on item Authorization Rules_1 464 and/or E-MAIL SERVER 122 settings. Still further, item Authorization History_2 446 and item Authorization History_3 426 can store similar information associated with each e-mail chain exchange.

In item First response include participant (e-mail_2) 430, 'Deepak' included 'Eela' (item Include_2 440 and reflected in item addressee_Cc_2 436) by selecting Item Include Participant 404. Item Include_2 440 comprises a 'cc:' to indicate the include participant's role (e.g., courtesy copy). In this example, current participants from item Originating e-mail chain (e-mail_1) 450 can be notified of the included participant ('Eela') and item Notify History_2 442 indicates that Deepak, Mike and Jim have been notified of Eela's inclusion. Further, item Authorization Rules_1 464 comprises 'abc.com' indicating that only participants in the 'abc.com' e-mail domain can be include participants. It should be noted that participants indicated by first name in FIG. 4 can be considered as belonging to abc.com e-mail domain. It should be further noted that item Authorization Rules_2 444 repeats the prior e-mail chain exchange authorization rules (e.g., item Authorization Rules_1 464) and can be modified by an e-mail chain originator/approver (e.g., item Approver 470). Item Second response include participant (e-mail_3) 410, 'Jane' included 'Jeff' and Nilesh@xyz.com' (item Include_3 420 and reflected in item addressee_To_3 414) by selecting Item Include Participant 404. Item Include_3 420 comprises an 'ad:' to indicate the include participant's role (e.g., addressee). In this example, current participants from item First response include participants (e-mail_2) 430 (e.g., item addressee_To_2 434 and addressee_Cc_2 436) can be notified of the include participants (e.g., item Include_2 440). It should be noted in this example that 'Eela' indicated in item addressee_Cc_2 436 can be considered 'notified' of inclusion by receiving Item First response include participant (e-mail_2) 430 as compared to participant notifications sent toward current participants.

Item Notify History_3 422 indicates that Jane, Mike and Jim have been notified of the include participants of item Second response include participant (e-mail_3) 410. In this example, Deepak may be notified when he opens the e-mail chain or Deepak may have an include participants setting to suppress participant notification output.

Item Approver 470 indicates that the e-mail chain originator is the approver assigned to the e-mail chain and in some embodiments of the present invention Jane can assign/delegate another participant as an approver and/or modifier of authorization rules field(s) (e.g., Items Authorization Rules_3 424, Authorization Rules_2 444 and Authorization Rules_1 464).

Item Authorization Rules_3 424 indicates authorization rules have been updated since the origination of the current e-mail chain. In one embodiment of the present invention, participant a participant can add an include participant and if an authorization result is failed (e.g., authorization rules limiting domain @xyz.com) then a workflow permission request can be sent toward an approver (e.g., item Approver 470) to provide a permission response to accept/deny the permission request. If the authorization request is denied by the approver, then the originator of the include request is notified based on the permission response and the include participant process is cancelled. If the authorization request is accepted by the approver, then the originator of the include request can be notified of acceptance based on the permission response, relevant authorization rules updated and the include participant process proceeds toward conclusion. It should be noted that in FIG. 4 example, Jane is identified as item Approver 470 and the authorization process workflow process to permit include participants from @xyz.com could have been automatically approved with an authorization rules update (e.g., item Authorization Rules_3 424).

Item Local Notify 472 represent a predetermined participant notification override that can be specified in the current e-mail chain. In the example, 'Jane' registered a mobile device texting number in item Local Notify 472. If an include participant event and/or authorization request occurs, 'Jane' can receive a text message in addition to and/or as an alternative to 'Jane's' predetermined participant notification settings. It should be noted that in one embodiment of the present invention, item Tools 406 could be used to set local notification method of item Local Notify 472.

It should be noted that 'Mary' (item addressee_To_3 414) may not have opened the e-mail chain and Mary's participant notification settings can be set to create participant notification upon interaction with the e-mail chain (e.g., delayed participant notification). In this case, if Mary opens item Second response include participant (e-mail_3) 410, PARTICIPANT NOTIFIER 128 can search include fields in the e-mail chain and determine that Mary has not been notified of any include participants. PARTICIPANT NOTIFIER 128 can output participant notification to comprise Eela, Jeff and Nilesh@xyz.com, with participant notification updates made to respective item Notify History_3 422 and item Notify History_2 442 fields to record the associated participant notifications.

It should be further noted that FIG. 4 illustrates an affected e-mail chain comprising data/metadata used by E-MAIL CHAIN MANAGER.124. In some embodiments of the present invention, one or more data stores in combination and/or separate with E-MAIL CHAIN MANAGER.124 can be employed to manage e-mail chain include participant operation.

Figure 5:
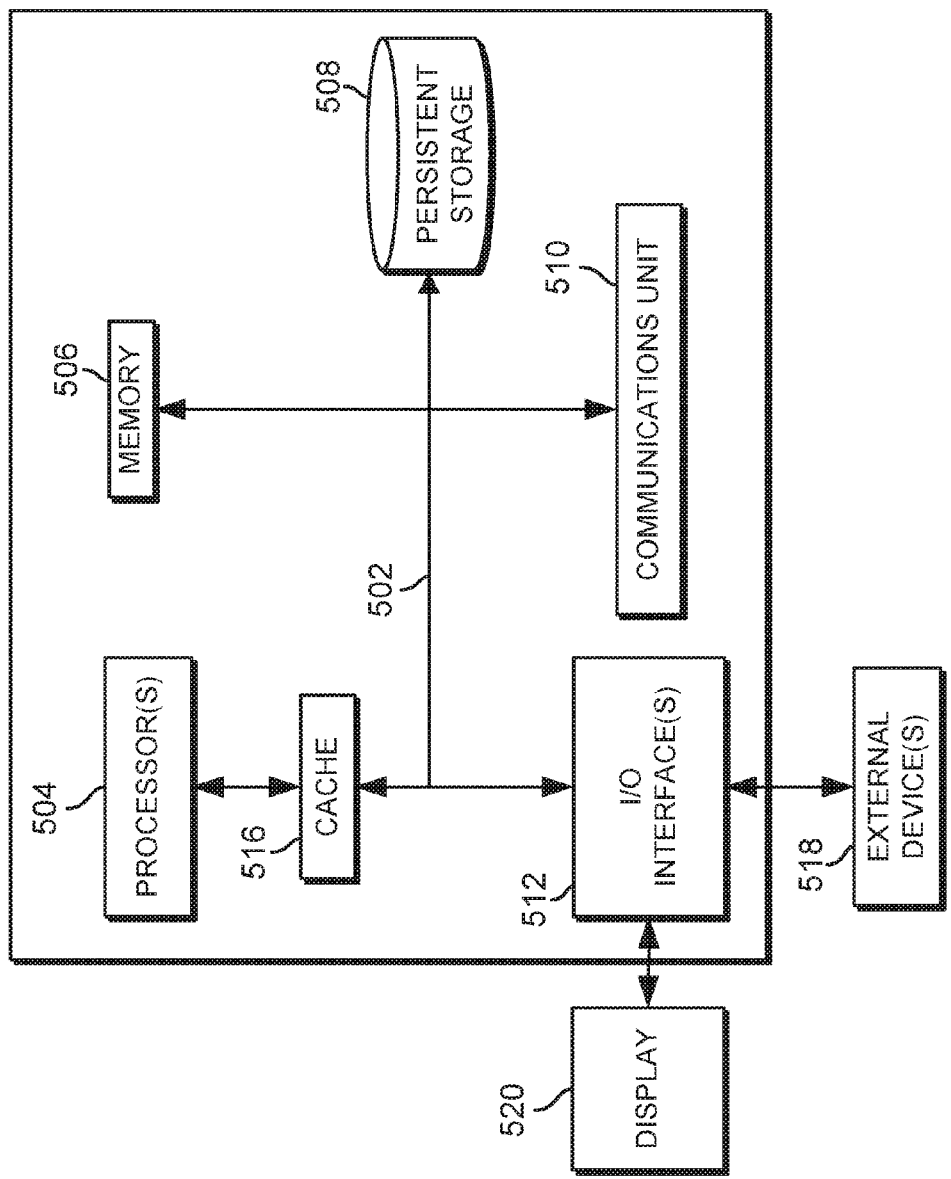
FIG. 5 illustrates a block diagram of components of the server and/or the computing device, in accordance with an embodiment of the present invention.

FIG. 5 illustrates a block diagram of components of COMMUNICATION DEVICE 110 and COMPUTER SYSTEM 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as, microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as, microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as, a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punch-cards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for new recipient inclusion to e-mail chains, the method comprising:
   receiving, by one or more computer processors, one or more include participants associated with an e-mail chain for addition to a current e-mail chain distribution, wherein the current e-mail chain distribution comprises an addressee field and a courtesy copy field;
   receiving, by one or more computer processors, one or more current participants in the current e-mail chain distribution for one or more participant notifications of the one or more include participants to the one or more current participants;
   receiving, by one or more computer processors, one or more authorization rules associated with the e-mail chain for authorizing the one or more include participants, wherein the one or more authorization rules are based on at least one of an e-mail server setting, an e-mail chain originator setting or an e-mail chain approver setting;
   determining, by one or more computer processors, inclusion authorizations for the one or more include participants based on comparing the one or more include participants with the one or more authorization rules and creating authorization results associated with the one or more include participants;
   responsive to determining the authorization results are passed, creating, by one or more computer processors, one or more authorized include participants;
   creating, by one or more computer processors, the one or more participant notifications wherein the one or more participant notifications are based on the one or more authorized include participants;
   outputting, by one or more computer processors, the one or more participant notifications based on predetermined participant preferences of the one or more current participants, wherein the one or more participant notifications output comprises at least one of a pop-up message, a notification e-mail or a text message;
   outputting, by one or more computer processors, the e-mail chain to the one or more authorized include participants;
   creating, by one or more computer processors, a next e-mail chain distribution based on combining the one or more authorized include participants and the one or more current participants;
   responsive to determining the authorization results are failed, creating, by one or more computer processors, an associated permission request;
   sending, by one or more computer processors, the associated permission request to an e-mail chain approver;
   receiving, by one or more computer processors, a permission response associated with the permission request from the e-mail chain approver;
   responsive to the permission response being a deny response, filtering by one or more computer processors, the one or more include participants associated to the deny response from the one or more authorized include participants; and
   responsive to the permission response being an approve response, adding by one or more computer processors, the one or more include participants associated to the approve response to the one or more authorized include participants.

* * * * *